US008811455B2

(12) United States Patent
Yi et al.

(10) Patent No.: US 8,811,455 B2
(45) Date of Patent: Aug. 19, 2014

(54) SYSTEM AND METHOD FOR PERFORMING WEIGHTED PROCESSING ON DOWN LINK SIGNAL

(75) Inventors: Zheng Yi, Shenzhen (CN); Gengshi Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 553 days.

(21) Appl. No.: 12/944,189

(22) Filed: Nov. 11, 2010

(65) Prior Publication Data
US 2011/0134970 A1 Jun. 9, 2011

(30) Foreign Application Priority Data
Nov. 11, 2009 (CN) .......................... 2009 1 0212153

(51) Int. Cl.
*H04B 7/14* (2006.01)
*H04W 52/46* (2009.01)
*H04B 7/06* (2006.01)
*H04W 8/24* (2009.01)
*H04W 88/04* (2009.01)

(52) U.S. Cl.
CPC ................ *H04W 52/46* (2013.01); *H04W 8/24* (2013.01); *H04B 7/0626* (2013.01); *H04W 88/04* (2013.01)
USPC ............ 375/211; 375/220; 375/296; 375/346

(58) Field of Classification Search
USPC .................. 375/211, 295, 296, 316, 346, 220
See application file for complete search history.

(56) References Cited

U.S. PATENT DOCUMENTS

2006/0105709 A1 5/2006 Oh et al.
2009/0143008 A1 6/2009 Hottinen et al.
(Continued)

FOREIGN PATENT DOCUMENTS

CN 1744458 A 3/2006
CN 1773886 A 5/2006
(Continued)

OTHER PUBLICATIONS

Extended European Search Report, mailed Mar. 1, 2011, in corresponding European Application No. 10188889.9 (4 pp.).

(Continued)

*Primary Examiner* — Shuwang Liu
*Assistant Examiner* — David S Huang
(74) *Attorney, Agent, or Firm* — Staas & Halsey LLP

(57) ABSTRACT

A method, device, and communications system for performing weighted processing on a downlink signal are provided. The method includes: acquiring a first CIR from a BS to a relay station and a second CIR from the relay station to a MS; determining a pre-coding weight and a relay weight according to the first CIR and the second CIR; and respectively sending the pre-coding weight and the relay weight to the BS and the relay station, so that the BS is enabled to perform weighted processing on a downlink signal according to the pre-coding weight to obtain a downlink pre-coding weighted signal and send the downlink pre-coding weighted signal to the relay station, and the relay station is enabled to perform weighted processing on the downlink pre-coding weighted signal received by the relay station according to the relay weight to obtain a downlink relay weighted signal and send the downlink relay weighted signal to the MS. Thereby, the downlink signal is optimized at the BS and the relay station respectively, thus optimizing the network capacity and improving the communication quality.

10 Claims, 9 Drawing Sheets

(56) References Cited

U.S. PATENT DOCUMENTS

| | | | |
|---|---|---|---|
| 2010/0062708 A1* | 3/2010 | Sangiamwong et al. | 455/24 |
| 2012/0140726 A1* | 6/2012 | Moon et al. | 370/329 |
| 2013/0188507 A1* | 7/2013 | Dayal et al. | 370/252 |

FOREIGN PATENT DOCUMENTS

| | | |
|---|---|---|
| CN | 1830158 | 9/2006 |
| CN | 101056130 | 10/2007 |
| EP | 1650883 | 4/2006 |
| WO | WO 2009/095744 | 8/2009 |

OTHER PUBLICATIONS

Chinese Search Report issued Dec. 17, 2012, in corresponding Chinese Patent Application No. 2009102121531.

Sidiropoulos, N. et al., *Transmit Beamforming for Phyiscal-Layer Multicasting*, IEEE Transactions on Signal Processing, vol. 54, No. 6, Jun. 2006, pp. 2239-2251.

Chinese Office Action mailed Aug. 1, 2013 in corresponding Chinese Application No. 200910212153.1.

\* cited by examiner

CONT FROM FIG. 2A

An iteration value of the relay weight is re-determined according to the iteration value of the pre-coding weight, where the iteration value of the relay weight is of the time when the downlink SINR threshold is reached and the total transmit power of the relay stations is minimum; an iteration value of the pre-coding weight is re-determined according to the re-determined iteration value of the relay weight, the downlink SINR threshold, and the second CIR, where the iteration value of the pre-coding weight is of the time when the downlink SINR threshold is reached and the total transmit power of the BS is minimum; and iteration is repeated until the minimum total transmit power of the relay stations converges to a fixed value. ⟋25

An iteration value of the pre-coding weight and an iteration value of the relay weight are respectively determined as the pre-coding weight and the relay weight, where the iteration value of the pre-coding weight and the iteration value of the relay weight are of the time when the minimum total transmit power of the relay stations converges to a fixed value. ⟋26

FIG. 2B

SYSTEM AND METHOD FOR PERFORMING WEIGHTED PROCESSING ON DOWN LINK SIGNAL

CROSS-REFERENCE TO RELATED APPLICATION

This application claims priority to Chinese Patent Application No. 200910212153.1, filed on Nov. 11, 2009, which is hereby incorporated by reference in its entirety.

FIELD OF THE TECHNOLOGY

The present invention relates to the field of communication technology, and more particularly to a system and a method for performing weighted processing on downlink signal.

BACKGROUND OF THE INVENTION

The Next Generation Network (NGN) raises higher requirements for the spectrum efficiency and power efficiency. Compared with the conventional cellular network, the relay mobile network can effectively improve the quality of the network coverage and provide a solution of a high price performance ratio for implementing broadband wireless access in high frequency band.

Multiple relay stations form a virtual array and work cooperatively in the relay mobile network. In the relay mobile network, a Mobile Station (MS) can access the wireless network by the collaboration of the multiple relay stations through a Base Station (BS). In the relay mobile network, the BS usually optimizes a downlink transmission vector of the relay mobile network and transmits a downlink signal according to the optimized downlink transmission vector in the prior art, so as to fulfill a downlink Signal to Noise Ratio (SINR) required by various MSs to receive signals.

During the implementation of the present invention, the inventors find that the prior art fails to provide a technical means of optimizing the signals transmitted from the relay station, so as to optimize the network capacity and ensure the communication quality.

SUMMARY OF THE INVENTION

The present invention is directed to a method, device, and communications system for performing weighted processing on downlink signal, so as to improve the network capacity and the communication quality.

One aspect of the present invention is to provide a method for performing weighted processing on downlink signal, which includes the following blocks.

A first Channel Impulse Response (CIR) from a BS to a relay station and a second CIR from the relay station to an MS are acquired.

A pre-coding weight and a relay weight are determined according to the first CIR and the second CIR.

The pre-coding weight and the relay weight are respectively sent to the BS and the relay station, so that the BS is enabled to perform weighted processing on a downlink signal according to the pre-coding weight to obtain a downlink pre-coding weighted signal and send the downlink pre-coding weighted signal to the relay station, and the relay station is enabled to perform weighted processing on the downlink pre-coding weighted signal received from the BS according to the relay weight to obtain a downlink relay weighted signal and send the downlink relay weighted signal to the MS.

Another aspect of the present invention is to provide a device for performing weighted processing on downlink signal, which includes an acquiring module, a weight determining module, and a weighted processing module.

The acquiring module is configured to acquire a first CIR from a BS to a relay station and a second CIR from the relay station to an MS.

The weight determining module is configured to determine a pre-coding weight and a relay weight according to the first CIR and the second CIR.

The weighted processing module is configured to respectively send the pre-coding weight and the relay weight to the BS and the relay station, so that the BS is enabled to perform weighted processing on a downlink signal according to the pre-coding weight to obtain a downlink pre-coding weighted signal and send the downlink pre-coding weighted signal to the relay station, and the relay station is enabled to perform weighted processing on the downlink pre-coding weighted signal received from the BS according to the relay weight to obtain a downlink relay weighted signal and send the downlink relay weighted signal to the MS.

Another aspect of the present invention is to provide a communications system, which includes a BS, a relay station, and an MS, and further includes a downlink signal weighted processing device.

The downlink signal weighted processing device is configured to acquire a first CIR from the BS to the relay station and a second CIR from the relay station to the MS; determine a pre-coding weight and a relay weight according to the first CIR and the second CIR; and respectively send the pre-coding weight and the relay weight to the BS and the relay station.

The BS is configured to perform weighted processing on the downlink signal according to the pre-coding weight to obtain a downlink pre-coding weighted signal, and send the downlink pre-coding weighted signal to the relay station.

The relay station is configured to perform weighted processing on the downlink pre-coding weighted signal received from the BS according to the relay weight to obtain a downlink relay weighted signal, and send the downlink relay weighted signal to the MS.

In the embodiments of the present invention, a pre-coding weight for implementing pre-coding weighted processing on downlink signal to be sent from a BS to an MS is determined for the BS, and a replay weight for performing weighted processing on the downlink signal from the BS to a relay station is determined for the relay station, that is, the downlink signal is optimized at the BS and the relay station respectively, thus optimizing the network capacity and improving the communication quality.

BRIEF DESCRIPTION OF THE DRAWINGS

To illustrate the technical solution according to the embodiments of the present invention or in the prior art more clearly, the accompanying drawings for describing the embodiments or the prior art are given briefly below. Apparently, the accompanying drawings in the following description are only some embodiments of the present invention, and persons of ordinary skill in the art can derive other drawings from the accompanying drawings without creative efforts.

FIGS. 2A and 2B are a flow chart of a method for determining a pre-coding weight and a relay weight according to an embodiment of the present invention;

DETAILED DESCRIPTION OF THE EMBODIMENTS

The technical solutions of the present invention will be clearly and fully described in the following with reference to the accompanying drawings. It is obvious that the embodiments to be described are only a part rather than all of the embodiments of the present invention. All other embodiments derived by persons of ordinary skill in the art based on the embodiments of the present invention without creative efforts shall fall within the protection scope of the present invention.

Figure 1:
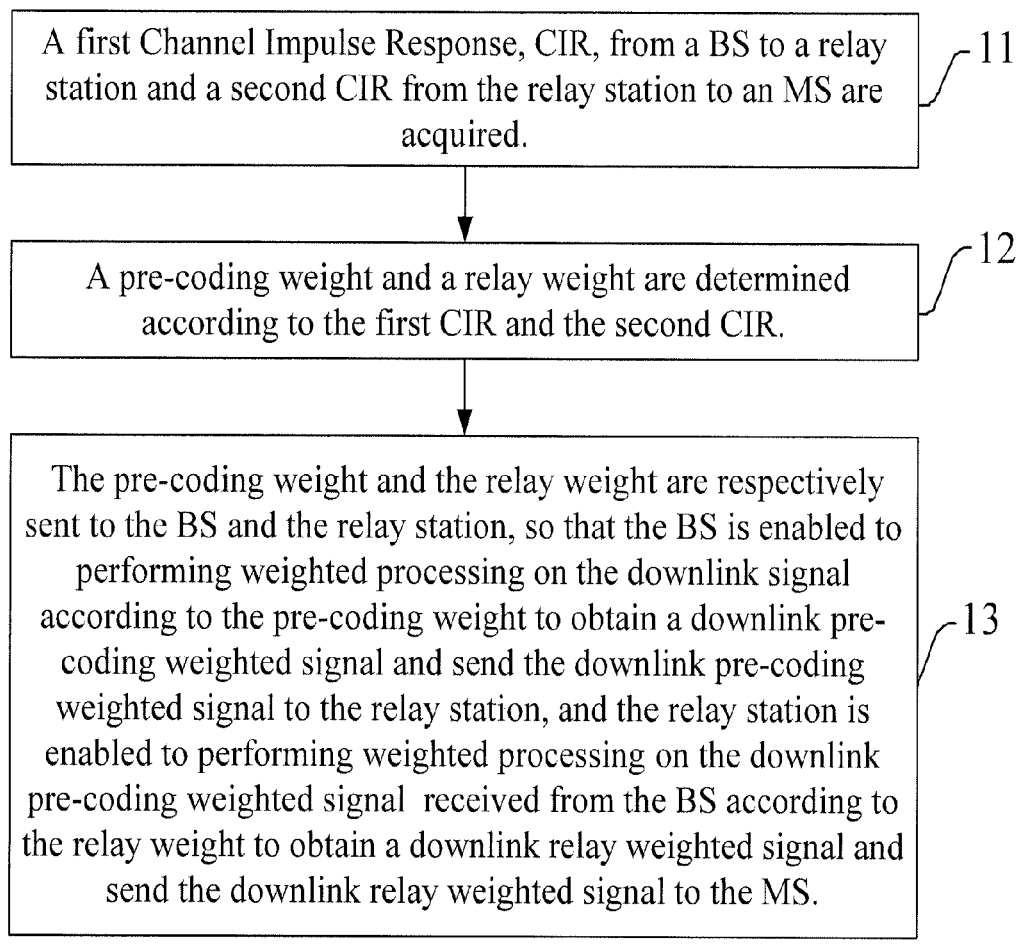
FIG. 1 is a flow chart of a method for performing weighted processing on downlink signal according to an embodiment of the present invention.

FIG. 1 is a flow chart of a method for performing weighted processing on downlink signal according to an embodiment of the present invention. As shown in FIG. 1, the method includes the following blocks.

Block 11: A first Channel Impulse Response, CIR, from a BS to a relay station and a second CIR from the relay station to an MS are acquired.

The first CIR may be detected and acquired by the relay station. The second CIR from the relay station to the MS may be detected and acquired by the MS and sent to the relay station by the MS. Alternatively, in a time division communications system where uplink communication and downlink communication operate on the same frequency point, the CIR from the relay station to the MS is identical to the CIR from the MS to the relay station. Therefore, the CIR from the MS to the relay station detected by the relay station in the uplink communication may be taken as the above second CIR.

Block 12: A pre-coding weight and a relay weight are determined according to the first CIR and the second CIR.

The pre-coding weight is used by the BS to perform pre-coding weighted processing on downlink signal to be sent to the MS, and the relay weight is used by the relay station to perform relay weighted processing on the signal received from the BS. An updating period of the relay weight and the pre-coding weight may be set according to actual requirements, and dynamic updating is implemented with the updating period as a time interval.

Block 13: The pre-coding weight and the relay weight are respectively sent to the BS and the relay station, so that the BS is enabled to perform weighted processing on the downlink signal according to the pre-coding weight to obtain a downlink pre-coding weighted signal and send the downlink pre-coding weighted signal to the relay station, and the relay station is enabled to perform weighted processing on the downlink pre-coding weighted signal received from the BS according to the relay weight to obtain a downlink relay weighted signal and send the downlink relay weighted signal to the MS.

In the downlink weighted processing method according to the present invention, a pre-coding weight for implementing pre-coding weighted processing on downlink signal to be sent from a BS to an MS is determined for the BS, and a replay weight for performing weighted processing on the downlink signal from the BS to a relay station is determined for the relay station, that is, the downlink signal is optimized at the BS and the relay station respectively, thus optimizing the network capacity and improving the communication quality.

Figure 2A:
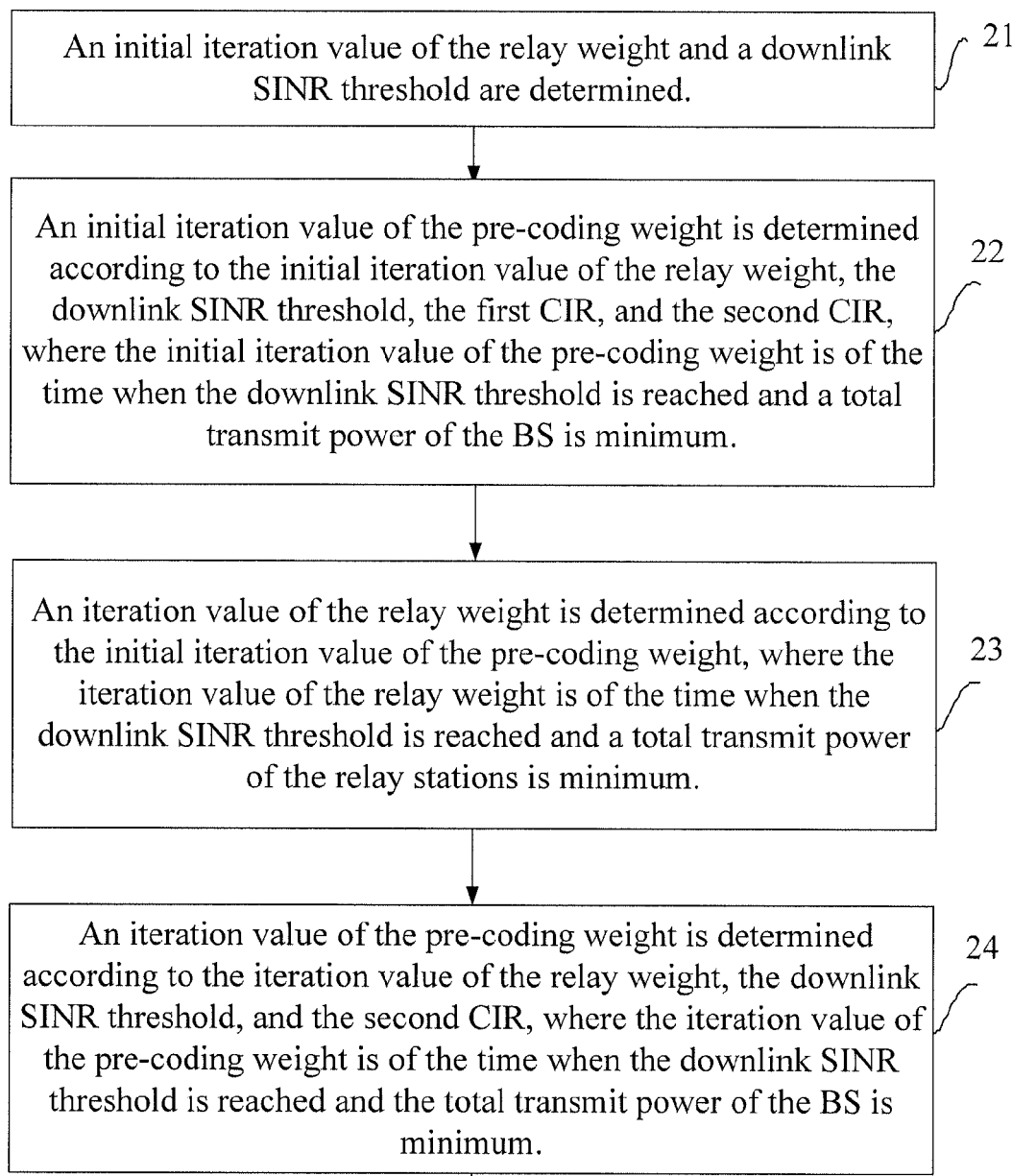

FIGS. 2A and 2B are a flow chart of a method for determining a pre-coding weight and a relay weight according to an embodiment of the present invention. As shown in FIG. 2, the method includes the following blocks.

Block 21: An initial iteration value of the relay weight and a downlink SINR threshold are determined.

Block 22: An initial iteration value of the pre-coding weight is determined according to the initial iteration value of the relay weight, the downlink SINR threshold, the first CIR, and the second CIR, where the initial iteration value of the pre-coding weight is of the time when the downlink SINR threshold is reached and a total transmit power of the BSs is minimum.

Block 23: An iteration value of the relay weight is determined according to the initial iteration value of the pre-coding weight, where the iteration value of the relay weight is of the time when the downlink SINR threshold is reached and a total transmit power of the relay stations is minimum.

Optionally, in this block, the iteration value of the relay weight is determined according to the initial iteration value of the pre-coding weight, where the iteration value of the relay weight is of the time when the downlink SINR threshold is reached, the total transmit power of the relay stations is minimum, and the transmit power of any one of the relay stations is smaller than or equal to a preset threshold.

Block 24: An iteration value of the pre-coding weight is determined according to the iteration value of the relay weight, the downlink SINR threshold, and the second CIR, where the iteration value of the pre-coding weight is of the time when the downlink SINR threshold is reached and the total transmit power of the BSs is minimum.

Block 25: An iteration value of the relay weight is re-determined according to the iteration value of the pre-coding weight, where the iteration value of the relay weight is of the time when the downlink SINR threshold is reached and the total transmit power of the relay stations is minimum; an iteration value of the pre-coding weight is re-determined according to the re-determined iteration value of the relay weight, the downlink SINR threshold, and the second CIR, where the iteration value of the pre-coding weight is of the time when the downlink SINR threshold is reached and the total transmit power of the BSs is minimum; and iteration is repeated until the minimum total transmit power of the relay stations converges to a fixed value.

Optionally, in this block, an iteration value of the relay weight is re-determined according to the re-determined iteration value of the pre-coding weight, where the iteration value of the relay weight is of the time when the downlink SINR threshold is reached, the total transmit power of the relay stations is minimum, and the transmit power of any one of the relay stations is smaller than or equal to the preset threshold. Restricted by physical conditions, the transmit power of each relay station cannot be increased infinitely. The solution takes the total transmit power of all the relay stations and the transmit power of each relay station into consideration, the downlink SINR threshold is reached while the total transmit power of all the relay stations is minimum and the transmit power of each relay station is smaller than a certain threshold, and thus the feasibility of the solution is improved.

Block 26: An iteration value of the pre-coding weight and an iteration value of the relay weight are respectively determined as the pre-coding weight and the relay weight, where the iteration value of the pre-coding weight and the iteration value of the relay weight are of the time when the minimum total transmit power of the relay stations converges to a fixed value.

A BS performs pre-coding weighted processing on downlink signal to be sent to a MS according to the pre-coding weight to obtain a downlink pre-coding weighted signal, and sends the downlink pre-coding weighted signal to a relay station. After receiving the downlink pre-coding weighted signal, the relay station performs relay weighted processing on the downlink pre-coding weighted signal according to the relay weight, so as to obtain a downlink relay weighted signal, and sends the downlink relay weighted signal to the MS.

In this embodiment, the pre-coding weight and the relay weight are jointly determined by using the iteration method, and the downlink signal is performed weighted processing according to the determined pre-coding weight and the relay weight respectively, so that when the downlink signal sent from the BS to the MS reaches the preset downlink SINR threshold, the total transmit power of the BSs is minimum and the total transmit power of the relay stations is minimum, thus optimizing the network capacity and improving the communication quality. If an upper limit of the transmit power of each relay station is taken into consideration when the pre-coding weight and the relay weight are jointly determined, the feasibility of the solution and the reliability of the implementation can be further improved.

The theoretical principle of the method for determining the pre-coding weight and the relay weight according to the present invention will be described below with reference to a specific application scenario.

Figure 3:
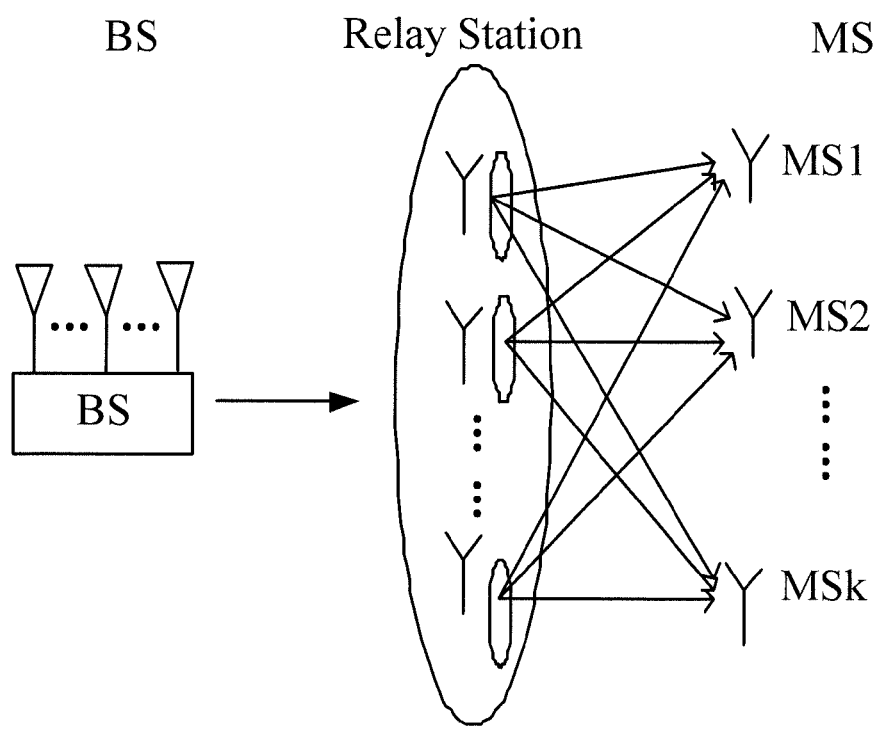
FIG. 3 is a schematic structural view of an application scenario of a relay communications system according to an embodiment of the present invention.

FIG. 3 is a schematic structural view of an application scenario of a relay communications system according to an embodiment of the present invention. As shown in FIG. 3, the relay communications system includes a BS having N antennas, R single antenna relay stations, and M single antenna MSs. The BS having N antennas sends signals to the M single antenna MSs through the R single antenna relay stations, and the signals sent by the BS to the MSs are downlink signals.

In the application scenario as shown in FIG. 3, the downlink signal $X_r$ received by the relay station from the BS may be expressed as follows:

$$X_r = [x_1, x_2 \ldots x_r \ldots x_R]^T$$

The downlink signal received by any one of the relay stations from the BS may be expressed as follows:

$$x_r = h_r^T \sum_{i=1}^{M} t_i s_i + v_r \quad (1)$$

In the above formula (1), $x_r$ represents the downlink signal received by the r th relay station from the BS, and $1 \leq r \leq R$; $s_i$ represents the downlink signal that needs to be sent by the BS to the i th MS, and $1 \leq i \leq M$; $t_i$ represents the pre-coding weight used by the BS to perform weighted processing on the downlink signal transmitted from the BS to the i th MS; $h_r^T$ represents the CIR between each antenna of the BS and the r th relay station, that is, the first CIR according to the embodiment of the present invention; and $v_r$ represents the noises introduced by the r th relay station.

After receiving the downlink signal from the BS, each relay station performs weighted processing on the received downlink signal and sends the weighted downlink signal on which the weighted processing is performed to the MS. In the embodiment of the present invention, the weighted downlink signal on which the relay station performs weighted processing is referred to as a downlink relay weighted signal, which may be expressed as follows:

$$u = W^H X_r \quad (2)$$

In the above formula (2), u represents the downlink relay weighted signal obtained by the relay station after performing the relay weighted processing on the received downlink signal from the BS; and W represents a vector expression of the relay weight which the relay station performs the relay weighted processing on the received downlink signal from the BS according to, which may be an initial value of the relay weight or an iteration value of the relay weight in the actual calculation, and can be specifically demonstrated as follows:

$$W = \mathrm{diag}(w_1, w_2 \ldots w_r \ldots w_R)$$

where $w_r$ is the relay weight of the r th relay station, and $1 \leq r \leq R$.

The downlink relay weighted signal received by the MS may be expressed as follows:

$$y_i = g_i^T u + n_i \quad (3)$$

$y_i$ may be decomposed into the following formula:

$$y_i = \underbrace{g_i^T W^H H t_i s_i}_{\text{Desired signal}} + \underbrace{g_i^T W^H H \sum_{j=1, j \neq i} t_j s_j}_{\text{Interference}} + \underbrace{g_i^T W^H v + n_i}_{\text{Noise}} \quad (4)$$

In the above formula (3), $g_i$ represents the CIR from the i th relay station to the MS, that is, the second CIR according to the embodiment of the present invention. It can be known by analyzing the formula (3) that the downlink signal received by the MS mainly includes three parts: the desired signal, interference, and noise. Thus, the SINR of the downlink signal received by the k th MS is:

$$SINR_k = \frac{P_s^k}{P_i^k + P_n^k} \quad (5)$$

In the above formula (5), $P_s^k$ represents the signal power of the downlink signal received by the k th MS, and $P_s^k$ may be expressed in the following formula:

$$P_s^k = E\{(g_k^T W^H H t_k s_k)^H (g_k^T W^H H t_k s_k)\} \quad (6)$$
$$= E\{t_k^H H^H W g_k^* g_k^T W^H H t_k\} E\{s_k^* s_k\}$$
$$= t_k^H H^H W R_g^k W^H H t_k$$

where $R_g^k$ represents an autocorrelation matrix of the CIR from the relay station to the k th MS, that is, the autocorrelation matrix of the second CIR from the relay station to the k th MS in the embodiment of the present invention.

$P_i^k$ is the interference power of the downlink signal received by the k th MS, and $P_i^k$ may be expressed in the following formula:

$$P_i^k = E\left\{\left(g_k^T W^H H \sum_{j=1, j \neq k}^M t_j s_j\right)^H \left(g_k^T W^H \sum_{l=1, l \neq k}^M t_l s_l\right)\right\} \quad (7)$$

$$= \sum_{j=1, j \neq k}^M t_j^H H^H W R_g^k W^H H t_j$$

$P_n^k$ is the noise power of the downlink signal received by the k th MS from the BS, and $P_n^k$ may be expressed in the following formula:

$$P_n^k = E\{(g_k^T W^H v + n_k)^H (g_k^T W v + n_k)^H\} \quad (8)$$

$$= Tr\{W R_k^g W^H \sigma_v^2\} + \sigma_n^2$$

1. Determine an Optimal Condition for Processing the Downlink Signal of the Bs

In the embodiment of the present invention, the relay weight used by the relay station to perform weighted processing on the received downlink signal is not a fixed value, but instead an object to be optimized. In order to increase the network capacity, the total transmit power of the BSs and the relay stations can be reduced as much as possible when the SINR of the downlink signal received by any one of the MSs from the BS satisfies a preset requirement.

If the total transmit power of the BSs is considered to be minimized when the requirement of the downlink SINR is met, the following condition can be satisfied:

$$\min_{t_1, t_2 \ldots t_M} P_T \quad (9)$$

s.t. $SINR_k \geq \gamma_k$, for $k = 1, 2, \ldots, M$

The optimal condition 1 expressed by the above formula (9) is: enabling the downlink signal received by any one of the MSs from the BS to reach a desired value of the SINR, and minimizing the total transmit power of the BSs. $\gamma_k$ represents the desired value of the SINR when the k th MS receives the downlink signal from the BS, that is, the downlink SINR threshold according to the embodiment of the present invention; the subscript k represents a sequence number of the MS, and $1 \leq k \leq M$. $P_T$ represents the total transmit power of the BSs, and may be expressed in the following formula:

$$P_T = E\left\{\left(\sum_{i=1}^M t_i s_i\right)^H \left(\sum_{j=1}^M t_j s_j\right)\right\} \quad (10)$$

$$= \sum_{i=1}^M t_i^H t_i$$

$$= \sum_{i=1}^M Tr\{t_i^H t_i\}$$

According to the formulas (5), (6), (7), (8), and (10), the optimal condition expressed in the formula (9) may be demonstrated as follows:

$$\min_{t_1, t_2 \ldots t_M} \sum_{i=1}^M Tr\{t_i^H t_i\} \quad (11)$$

s.t. $\dfrac{t_k^T H^H W R_g^k W^H H t_k}{\sum_{j=1, j \neq k}^M t_j^H H^H W R_g^k W^H H t_j + Tr\{W R_k^g W^H \sigma_v^2\} \sigma_n^2} \geq \gamma_k,$ for $k = 1, 2, \ldots, M$ To simplify the calculation, the following formula is defined:

$$T_i = t_i^H t_i, i = 1, 2 \ldots M \quad (12)$$

Thus, the formula (11) can be expressed as follows:

$$\min_{t_1, t_2 \ldots t_M} \sum_{k=1}^M Tr\{T_k\} \quad (13)$$

s.t. $Tr\left(U_k\left(T_k - \gamma_k \sum_{j=1, j \neq k}^M T_j\right)\right) \geq \gamma_k (Tr(W R_g^k W^H) \sigma_v^2 + \sigma_n^2)$ $T_k \geq 0$ for $k = 1, 2, \ldots, M$ where
$T_k = t_k^H t_k$, k=1, 2, ..., M
$W = diag(w_1, w_2 \ldots w_r \ldots w_R)$
$U_k = H^H W R_g^k W^H H$ γ represents the downlink SINR threshold of the MS;

t represents the initial iteration value of the pre-coding weight or the iteration value of the pre-coding weight;

$g_k$ represents the second CIR from the relay station to the MS;

$R_g^k$ represents the autocorrelation matrix of $g_k$, the superscript or subscript k represents the sequence number of the MS, and $1 \leq k \leq M$, M representing a total number of the MSs;

$\sigma_2^2$ represents the downlink interference power, and $\sigma_n^2$ represents the downlink noise power;

w represents the initial value of the relay weight or the iteration value of the relay weight, the subscript r represents a sequence number of the relay station, and $1 \leq r \leq R$, R representing a total number of the relay stations; and H represents the first CIR from the BS to the relay station.

2. Determine an Optimal Condition for the Relay Station to Process the Downlink Signal of the MS in the Case of a Single MS Next, the optimal condition for minimizing the total transmit power of the relay stations when any one of the MSs (that is, a single MS) satisfies the requirement of the downlink SINR is further considered.

The weighted downlink signal on which the weighted processing is performed and received by the single MS may be expressed as follows:

$$y = \underbrace{w^H diag\{g^T\} H t s}_{\text{Desired signal}} + \underbrace{w^H diag\{g^T\} v + n}_{\text{Colored noise}} \quad (14)$$

Thus, the optimal condition for minimizing the total transmit power of the relay stations when any one of the MSs satisfies the requirement of the downlink SINR may be expressed as follows:

$$\min_{w} w^H D w \quad (15)$$

$$\text{s.t.} \quad \frac{w^H \text{diag}\{g^T\} H t t^H H^H \text{diag}\{g^*\} w}{\sigma_v^2 w^H \text{diag}\{g^T\} \text{diag}\{g^*\}^H w + \sigma_n^2} \geq \gamma$$

The optimal condition 2 expressed by the above formula (15) is: enabling the downlink signal received by any one of the MSs from the BS to reach a desired value of the SINR, and minimizing the total transmit power of the relay stations. $\gamma$ represents the desired value of the SINR when the MS receives the downlink signal, and D is a user-defined matrix, which is defined as follows:

$$D \triangleq \text{diag}([R_x]_{1,1}, [R_x]_{2,2}, \ldots, [R_x]_{R,R}) \quad (16)$$

In the formula (16), $R_x$ represents an energy sum of the autocorrelation matrix of the pre-coded downlink CIR from the BS to the relay station and the interference, that is, the energy sum of the autocorrelation matrix of the pre-coded first CIR according to the embodiment of the present invention and the interference; $[R_x]_{1,1}$ represents Row 1, Column 1 of $R_x$, and it can be deduced that $[R_x]_{R,R}$ represents Row R, Column R of $R_x$, R representing the total number of the relay stations, and specifically, $R_x$ satisfies the following formula:

$$R_x = H t t^H H^H + \sigma_v^2 I \quad (17)$$

Set $\tilde{w} = D^{1/2} w$, and the optimal condition expressed by the formula (15) may be demonstrated as follows:

$$\min_{\tilde{w}} \|\tilde{w}\|^2 \quad (18)$$

$$\text{s.t.} \quad \tilde{w}^H D^{-1/2} (C - \gamma E) D^{-1/2} \tilde{w} \geq \gamma \sigma_n^2$$

where $E = \sigma_v^2 \text{diag}(g^T) \text{diag}(g^*)$ $C = \text{diag}(g^T) H t t^H H^H \text{diag}(g^*)$.

$\tilde{w}$ in the above formula (18) may be solved by using a Lagrangian equation, and the Lagrangian equation is as follows:

$$L(\tilde{w}, \lambda) = \|\tilde{w}\|^2 - \lambda(\tilde{w}^H D^{-1/2} (C - \gamma E) D^{-1/2} \tilde{w} - \gamma \sigma_n^2) \quad (19)$$

Set the partial derivative $\partial L(\tilde{w}, \lambda) / \partial \tilde{w}^H$ to zero, and thus:

$$D^{-\frac{1}{2}} (C - \gamma E) D^{-\frac{1}{2}} \tilde{w} = \frac{1}{\lambda} \tilde{w} \quad (20)$$

Multiply both sides of the formula (20) by $\lambda \tilde{w}^H$ respectively, and then:

$$\|\tilde{w}\|^2 = \lambda \tilde{w}^H D^{-1/2} (C - \gamma E) D^{-1/2} \tilde{w} = \lambda \gamma \sigma_n^2 \quad (21)$$

Transform the formula (21) to get:

$$\hat{w} = D^{-\frac{1}{2}} \hat{\tilde{w}} \quad (22)$$

$$= \left( \frac{\gamma \sigma_n^2}{u^H D^{-1/2} (C - \gamma E) D^{-1/2} u} \right)^{\frac{1}{2}} D^{-\frac{1}{2}} \wp \left( D^{-\frac{1}{2}} (C - \gamma E) D^{-\frac{1}{2}} \right)$$

where $$u = \wp \left( D^{-\frac{1}{2}} (C - \gamma E) D^{-\frac{1}{2}} \right)$$

and $\wp( )$ represent seeking a dominant eigenvector.

$\hat{w}$ obtained from the formula (22) is the optimized relay weight, which is of the time when the downlink signal received by the MS reaches the desired value of the downlink SINR and the total transmit power of the relay stations is minimum.

3. Determine an Optimal Condition for the Relay Station to Process the Downlink Signal of the MS in the Case of Multiple MSS If multiple MSs are provided in the communications system, interference will be generated among the MSs when the multiple MSs are receiving the downlink signals. In this circumstance, the downlink signal received by the k th MS may be expressed as follows:

$$y_k = \underbrace{w^H \text{diag}\{g_k^T\} H t_k s_k}_{\text{Desired signal}} + \underbrace{w^H \text{diag}\{g_k^T\} H \sum_{j=1, j \neq k}^{M} t_j s_j}_{\text{Interference}} + \underbrace{w^H \text{diag}\{g_k^T\} v + n_k}_{\text{Colored noise}} \quad (23)$$

Thus, the optimal condition for minimizing the total transmit power of the relay stations when the k th MS satisfies the requirement of the downlink SINR may be expressed as follows:

$$\min_{w} P_R \quad (24)$$

$$\text{s.t.} \quad SINR_k \geq \gamma_k, \text{ for } k = 1, 2, \ldots, M$$

The optimal condition 3 expressed by the above formula (24) is: enabling the downlink signal received by any one of the MSs from the BS to reach a desired value of the SINR, and minimizing the total transmit power of the relay stations. $\gamma_k$ represents the desired value of the SINR when the k th MS receives the downlink signal, and the subscript k represents the sequence number of the MS, and $1 \leq k \leq M$. $P_R$ represents the total transmit power of the relay stations, and may be expressed in the following formula:

$$P_R = E\{u^H u\} \quad (25)$$

$$= Tr\{W^H E\{x x^H\} W\}$$

$$= w^H D w$$

where x represents the downlink signal received by the relay station from the BS; and D is the user-defined matrix, the definition of which may refer to the formula (16).

Expand the condition of the SINR $SINR_k \geq \gamma_k$ as shown in the formula (24) according to the formulas (23) and (25), the following may be obtained:

$$\frac{w^H E_k w}{w^H F_k w + \sigma_n^2} \geq \gamma_k \quad (26)$$

where $E_k$ and $F_k$ respectively satisfy the following relations:

$$E_k = \text{diag}(g_k^T) H t_k t_k^H H^H \text{diag}(g_k^*) \quad (27)$$

$$F_k = \text{diag}(g_k^T) \left( H \left( \sum_{j=1, j \neq k}^{M} t_k t_k^H \right) H^H + \sigma_v^2 I \right) \text{diag}(g_k^*) \quad (28)$$

According to the formulas (25), (26), (27), and (28), the optimal condition expressed by the formula (24) may be further demonstrated as follows:

$$\min_w w^H Dw \quad (29)$$
$$\text{s.t. } w^H(E_k - \gamma_k F_k)w \geq \gamma_k \sigma_n^2, \text{ for } k = 1, 2, \ldots, M$$

Set $Z=ww^H$, and assume that the rank of the matrix Z is 1, that is, Rank(Z)=1, and the optimal condition expressed by the formula (29) may be further demonstrated as follows:

$$\min_Z Tr(ZD) \quad (30)$$
$$\text{s.t. } Tr(Z(E_k - \gamma_k F_k)) \geq \gamma_k \sigma_n^2,$$
and
$$Z \geq 0 \text{ for } k = 1, 2, \ldots, M$$

When Rank(Z)=1 in solving the equation, the optimal solution of the formula (30) is Z, and w corresponding to the optimal solution Z is the desired relay weight.

If the optimal solution of Rank(Z)=1 does not exist in the formula (30), a randomization algorithm may be employed to acquire a sub-optimal value when the rank of Z is not 1 in the formula (30), and the principle thereof is to calculate through randomized initial selection of the unit vector, which is described in the following.

Step 1: Eigenvalue decomposition is performed on a Z matrix $Z_{opt}$ to obtain $Z_{opt}=U\Sigma U^H$; and a random variable $w_l = D^{-1/2}U\Sigma^{-1/2}e_l$ is determined, where U is a matrix arranged by eigenvectors of the Z matrix, $\Sigma$ is an eigenvalue matrix of the Z matrix, $w_l$ is an independent random variable that is uniformly distributed on a unit circle of a complex plane, and $[e_1]_i = e^{j\theta_{1,i}}$, $\theta_{1,i}$ being a random variable uniformly distributed within $[0,2\pi)$.

It can be proved that $w_l^H Dw_l = \text{trace}(Z_{opt})$, that is, the power of each single relay station and the total power of the relay stations are fixed, and thus the selection of $e_1$ does not influence the power of each single relay station and the total power of the relay stations. In the actual application, a value of $e_1$ may be randomly selected to act as an initial value of the independent random variable together with the $w_l$ corresponding to the $e_1$.

Step 2: The value of $\theta_{1,i}$ is altered to obtain a collection of $w_l$; and it is judged whether Z corresponding to each independent random variable in the collection $w_l$ satisfies the formula (30), if the formula (30) is not satisfied, a scaling process is performed on the independent random variables that do not satisfy the formula (30) (for example, multiplied by a constant), and if the scaled independent random variables satisfy the formula (30), $w_l$ that meets the restriction condition is selected as a candidate value for the next random iteration.

Step 3: If multiple $w_l$ satisfying the restriction condition exist in the collection $w_l$, Z corresponding to the $w_l$ candidate value with the minimum value of $w_l^H Dw_l$ is selected from the multiple $w_l$ that satisfy the restriction condition as the sub-optimal solution, and the w corresponding to the sub-optimal solution is the desired relay weight.

The optimal condition expressed in the above formula (30) is to achieve a large downlink SINR with a total transmit power of the relay stations as small as possible, that is, the relay stations are considered as a whole. Since the transmit power of each relay station cannot be increased infinitely, an upper limit of the maximum power exists. Thus, based on the optimal condition expressed in the formula (30), the optimal condition 4 can be obtained by further considering the transmit power of each relay station and making the transmit power of each relay station not exceeding a preset threshold: enabling the downlink signal received by any one of the MSs from the BS to reach a desired value of the SINR, and minimizing the total transmit power of the relay stations and making the transmit power of each relay station lower than the preset threshold $P_{Ri}$. The optimal condition may be expressed as follows:

$$\min_Z Tr(ZD) \quad (31)$$
$$\text{s.t. } Tr(Z(E_k - \gamma_k F_k)) \geq \gamma_k \sigma_n^2,$$
$$\text{for } k = 1, 2, \ldots, M$$
$$Z_{i,i} \leq P_{Ri}/[D]_{i,i}, \text{ for } i = 1, 2, \ldots, R \text{ and } Z \geq 0$$

If the optimal solution Z when Rank(Z)=1 exists in the above formula (31), the w corresponding to the optimal solution Z is the desired relay weight; and if the optimal solution when Rank(Z)=1 does not exist, the sub-optimal solution may be determined by using the above randomization algorithm, and the w corresponding to the sub-optimal solution is the desired relay weight.

Based on the above theory, the method for jointly determining the pre-coding weight t and the relay weight w, for weighted transmission of the downlink signal by the BS according to the pre-coding weight t, and for weighted transmission of the downlink signal by the relay station according to the relay weight w according to the embodiment of the present invention will be described below with reference to the application scenario as shown in FIG. 3. Specifically, the method includes the following steps.

Step 41: An initial iteration value of the relay weight is determined and a desired value of the downlink SINR $\gamma_k$ is set for the MS.

A downlink signal beam vector $w=c\times\text{vec}(v)$ received by the relay station is initialized, where $v_i=e^{j\theta_i}$ and $\theta_i$ are random variables uniformly distributed within $[0,2\pi)$, and c is a constant, the value of c is equal to or slightly larger than the noise power $\sigma_n^2$, introduced by the antenna of the MS for receiving the downlink relay signal.

Step 42: An initial iteration value of the pre-coding weight is determined according to the iteration value of the relay weight and the desired value of the SINR $\gamma_k$, so that $T_i$ can be calculated according to the formula (13), and the corresponding pre-coding weight $t_i$ can be obtained according to the definition of $T_i$ in the formula (12).

The iteration value of the relay weight w in Step 42 is the initial iteration value of the relay weight determined in Step 41 or the relay weight calculated in Step 43. When the iteration value of the relay weight w in Step 42 is the initial iteration value of the relay weight determined in Step 41, the initial iteration value of the relay weight determined in Step 41 and the desired value of the SINR $\gamma_k$ need to be substituted in the formula (13) to check whether the solution of $T_i$ exists, and if yes, Step 43 is performed; otherwise, it is proved that the actual network environment fails to meet the desired value of the SINR, and the requirement of the SINR needs to be lowered, that is, the desired value of the SINR needs to be decreased. The decreased desired value of the SINR is substituted into the formula (13) to check whether the solution exists, adjustment can be performed repeatedly until the solution of $T_i$ in the formula (13) is obtained, and Step 44 is then performed.

If the solution of $T_i$ in the formula (13) still does not exist after the desired value of the SINR is decreased for several times, the initial iteration value of the relay weight can be re-determined according to the method as shown in Step 41, the re-determined initial iteration value of the relay weight and the decreased desired value of the SINR are substituted into the formula (13), the initial iteration value of the relay weight and the desired value of the SINR $\gamma_k$ are repeatedly adjusted until the solution of $T_i$ in the formula (13) is obtained, and Step 43 is then performed.

Step 43: The relay weight w is calculated according to the calculated pre-coding weight $t_i$ and the formula (22) in the case of a single MS, where the relay weight w is of the time when the total transmit power of the relay stations is minimum; or the relay weight w is calculated according to the calculated pre-coding weight $t_i$, and the formula (30) in the case of multiple MSs, where the relay weight w is of the time when the total transmit power of the relay stations is minimum; or the relay weight w is calculated according to the calculated pre-coding weight $t_i$ and the formula (31) in the case of multiple MSs, where the relay weight w is of the time when the total transmit power of the relay stations is minimum and the transmit power of each relay station is smaller than or equal to the preset power threshold.

The relay weight solved according to the formula (30) or the formula (31) may be obtained by acquiring the optimal solution Z when Rank(Z)=1 in the formula (30) or the formula (31), and the w corresponding to the optimal solution Z is the desired relay weight. If the optimal solution when Rank(Z)=1 does not exist in the formula (30) or the formula (31), the above randomization algorithm is adopted to find the sub-optimal solution of the non-convex optimization problem, and the w corresponding to the sub-optimal solution is the desired relay weight.

Step 44: Step 42 and Step 43 are performed alternately until the minimum total transmit power of the relay stations approaches a fixed value during iteration; and the relay weight w and the pre-coding weight t corresponding to the fixed value are determined as the desired relay weight and pre-coding weight.

If a lower limit of the total transmit power of the relay stations exists (that is, a minimum total transmit power of the relay stations exists), after the iteration of Step 42 and Step 43 is alternately performed, the total transmit power of the relay stations will be decreased. It can be determined that the total transmit power of the relay stations after repeated iterations converges to a fixed value through the above algorithm, and the relay weight w and the pre-coding weight t corresponding to the fixed value are the desired relay weight and pre-coding weight.

Step 45: The BS performs pre-coding weighted processing on a downlink signal $$\sum_{i=1}^{M} s_i$$

to be sent to the MS according to the pre-coding weight determined in Step 44 to obtain a downlink pre-coding weighted signal $$\sum_{i=1}^{M} t_i s_i,$$

and sends the downlink pre-coding weighted signal $$\sum_{i=1}^{M} t_i s_i$$

to the relay station.

Step 46: After receiving the signal from the BS, the relay station performs relay weighted processing on the signal transmitted from the BS according to the relay weight determined in Step 44 (referring to the formula (2)), obtains a downlink relay weighted signal u, and sends the downlink relay weighted signal u to the MS.

The MS receives the downlink relay weighted signal from the relay station, and the signal satisfies the formula (4). The weighted the downlink signal according to the embodiment of the present invention facilitates the MS to meet the requirement of the downlink SINR and minimize the total transmit power of the relay stations, thus improving the network capacity and ensuring the communication quality.

Figure 4:
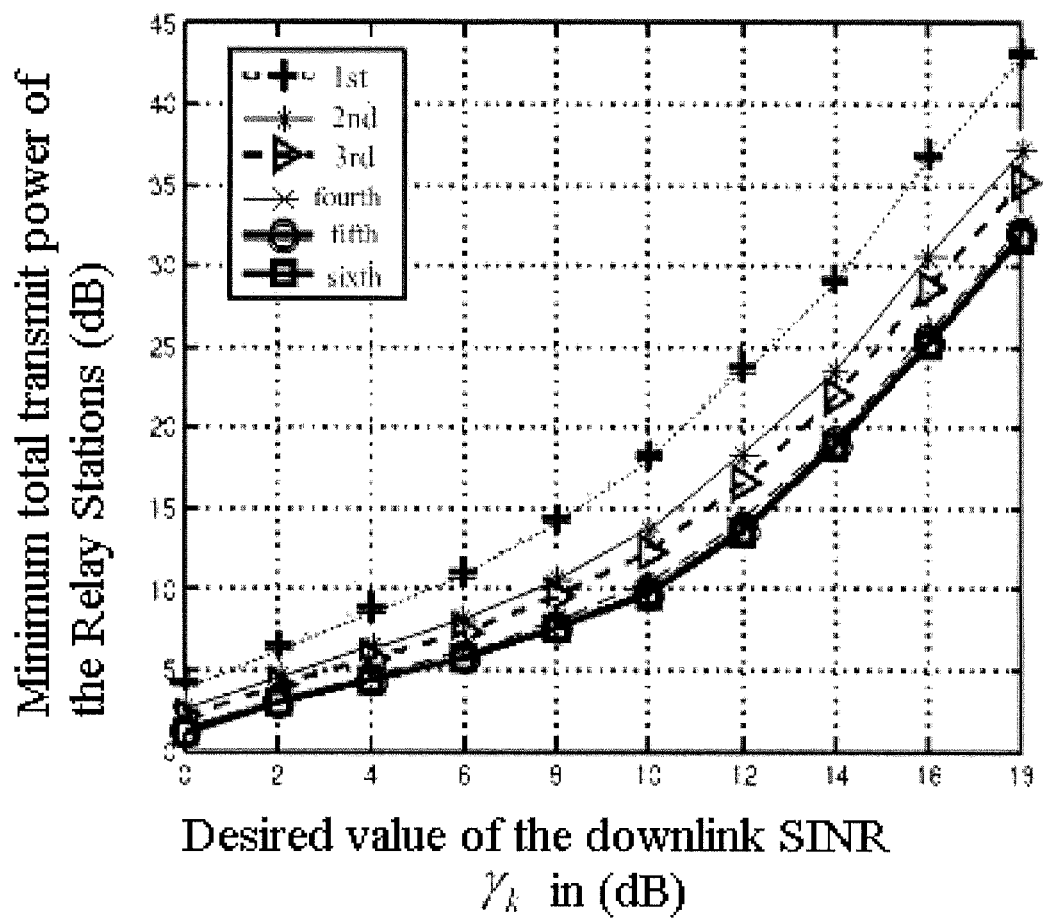
FIG. 4 is a trend diagram of the change of power resulted by multiple iterations according to an embodiment of the present invention.

The inventors adopt an analog simulation technical means during the implementation of the present invention, and carries out simulation analysis on experimental data obtained in the weighted processing of the downlink signal according to the embodiment of the present invention. FIG. 4 is a trend diagram of the change of power resulted by multiple iterations. As shown in FIG. 4, in the process of sampling the pre-coding weight and the relay weight jointly determined by the above iteration method, the MSs reach the same desired value of the downlink SINR, and the minimum total transmit power needed by the relay stations is increasingly decreased and gradually converges to a fixed value along with the times of iteration.

Figure 5A:
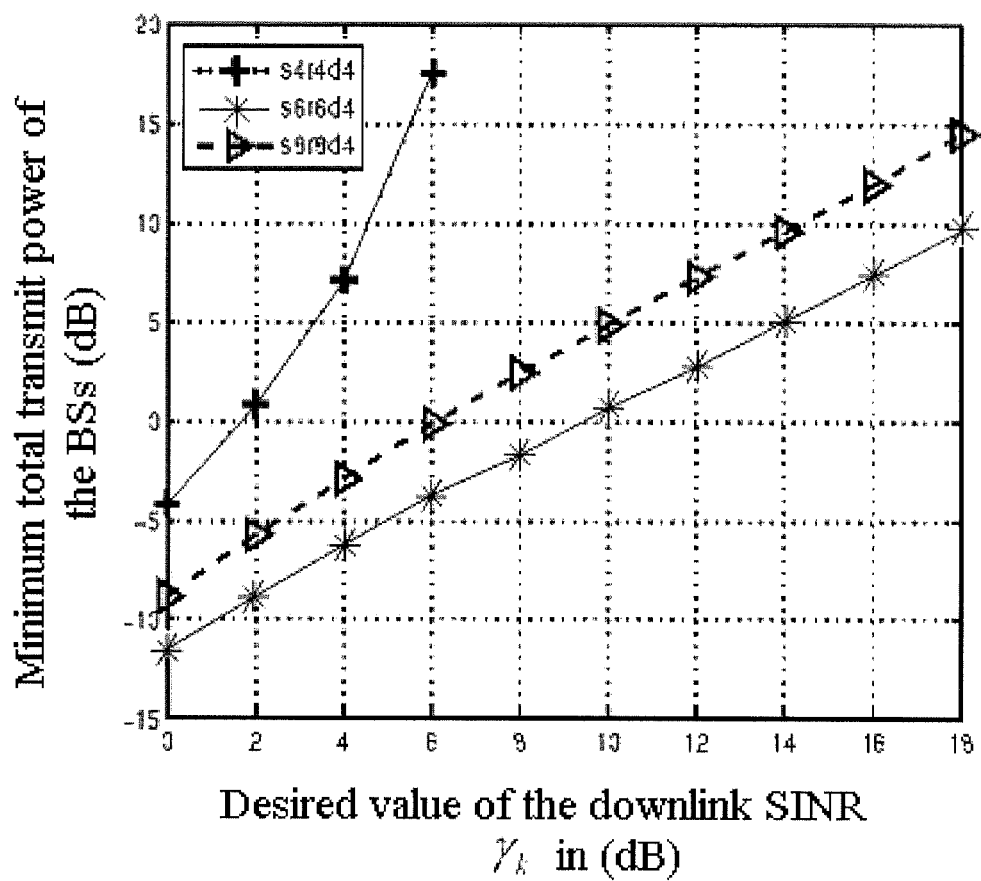
FIG. 5a is a schematic view of an embodiment illustrating a relation between the SINR and the minimum total transmit power of relay stations according to the present invention.
Figure 5B:
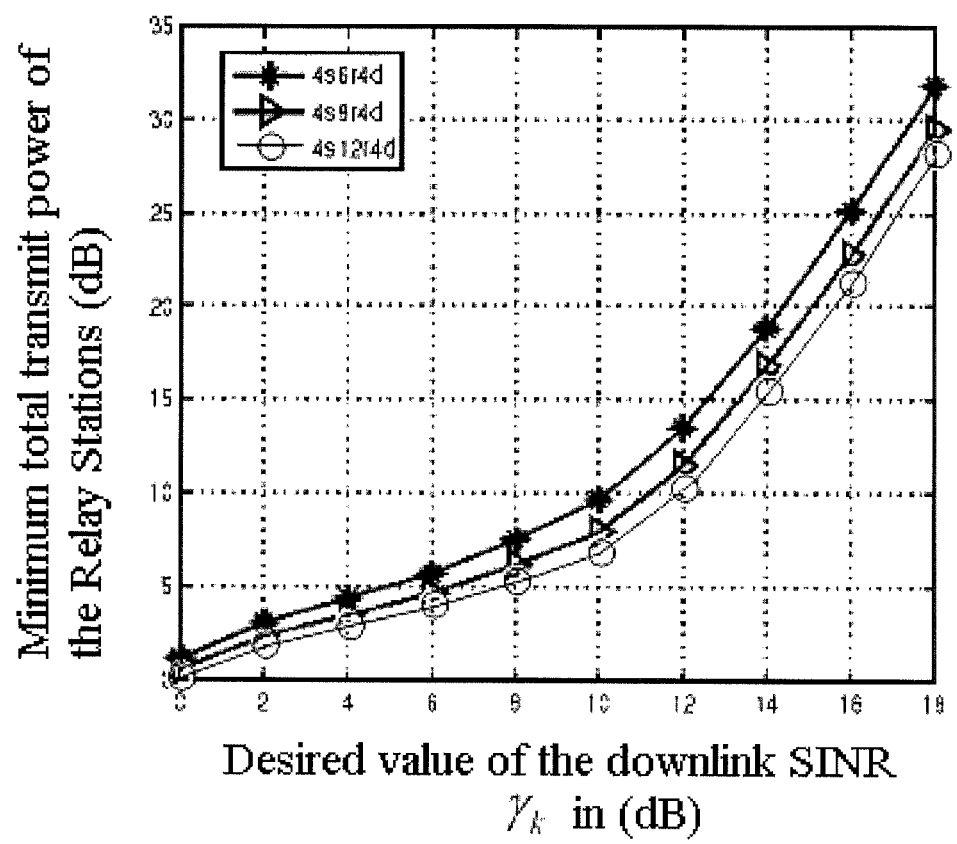
FIG. 5b is a schematic view of an embodiment illustrating a relation between the SINR and the minimum total transmit power of BSs according to the present invention.
Figure 5C:
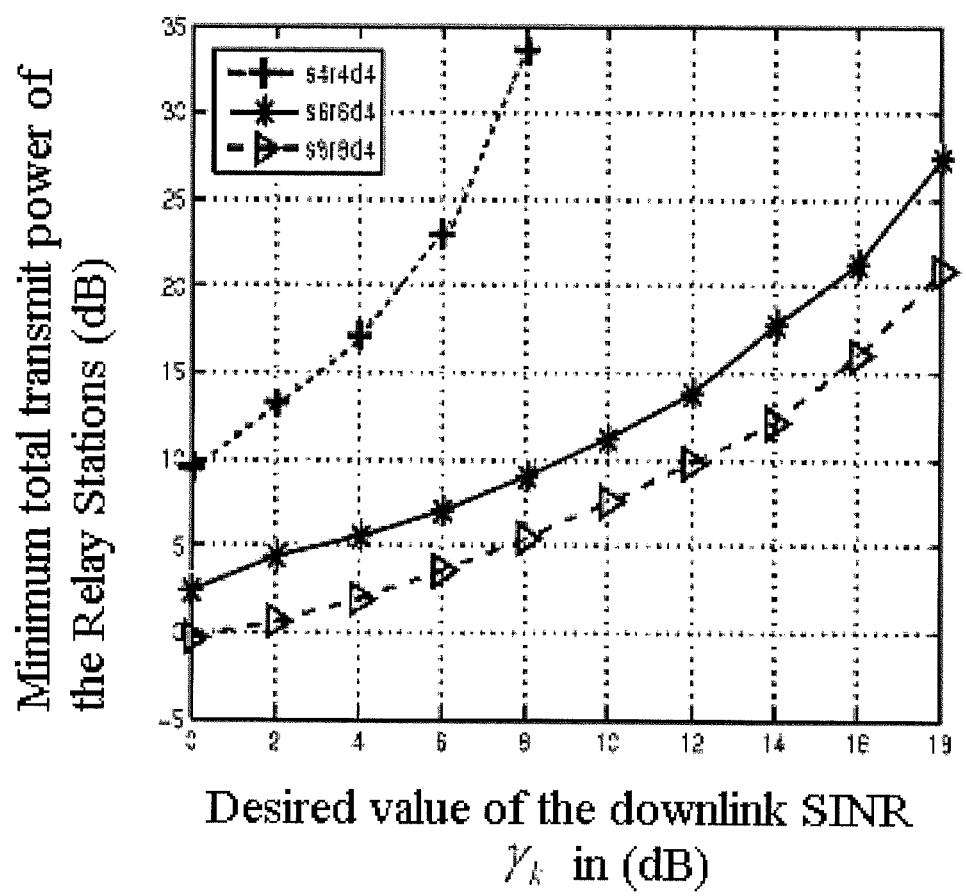
FIG. 5c is a schematic view of another embodiment illustrating a relation between the SINR and the minimum total transmit power of relay stations according to the present invention.

In addition, the inventors also compare the corresponding relations between the desired value of the downlink SINR and the minimum total transmit power needed by the relay stations in communications systems with different number s of the antenna of the BS, the number r of the relay stations, and the number d of the MSs. FIG. 5a is a schematic view of an embodiment illustrating a relation between the SINR and the minimum total transmit power of the relay stations according to the present invention; FIG. 5b is a schematic view of an embodiment illustrating a relation between the SINR and the minimum total transmit power of the BSs according to the present invention; and FIG. 5c is a schematic view of another embodiment illustrating a relation between the SINR and the minimum total transmit power of the relay stations according to the present invention. It can be seen from the change trend in FIG. 5a, FIG. 5b, and FIG. 5c that, in the case of multiple relay stations in the communications system according to the embodiment of the present invention, the total transmit power of the BSs and the total transmit power of the relay stations do not rise with the increase of the number of the relay stations; and instead, after the downlink signal is weighted according to the embodiment of the present invention, the value of the SINR desired by the MS can be met with the small total transmit power of the BSs and the small total transmit power of the relay stations. Therefore, the network capacity is optimized and the communication quality is improved.

Figure 6:
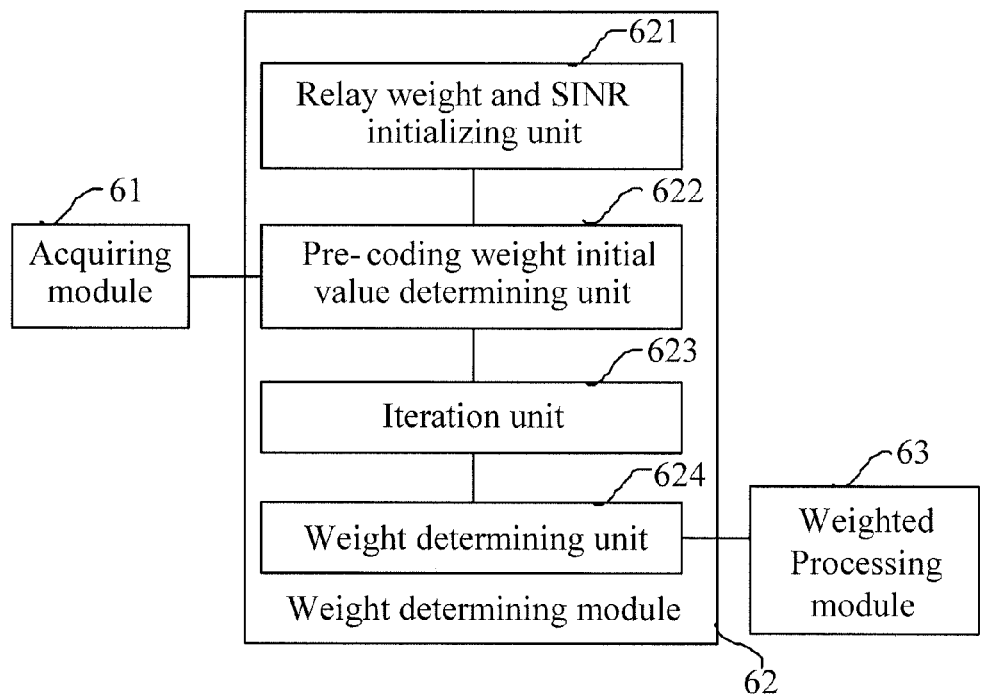
FIG. 6 is a schematic structural view of a device for performing weighted processing on downlink signal according to an embodiment of the present invention.

FIG. 6 is a schematic structural view of a device for performing weighted processing on downlink signal according to an embodiment of the present invention. As shown in FIG. 6, the device for performing weighted processing on the downlink signal includes an acquiring module 61, a weight determining module 62, and a weighted processing module 63.

The acquiring module 61 is configured to acquire a first CIR from a BS to a relay station and a second CIR from the relay station to an MS.

The weight determining module 62 is configured to determine a pre-coding weight and a relay weight according to the first CIR and the second CIR.

The weighted processing module 63 is configured to respectively send the pre-coding weight and the relay weight to the BS and the relay station, so that the BS is enabled to perform weighted processing on a downlink signal according to the pre-coding weight to obtain a downlink pre-coding weighted signal and send the downlink pre-coding weighted signal to the relay station, and the relay station is enabled to perform weighted processing on the downlink pre-coding weighted signal received from the BS according to the relay weight to obtain a downlink relay weighted signal and send the downlink relay weighted signal to the MS.

Based on the above technical solution, optionally, the weight determining module 62 may include a relay weight and SINR initializing unit 621, a pre-coding weight initial value determining unit 622, an iteration unit 623, and a weight determining unit 624.

The relay weight and SINR initializing unit 621 is configured to determine an initial iteration value of the relay weight and a downlink SINR threshold.

The pre-coding weight initial value determining unit 622 is configured to determine a initial iteration value of the pre-coding weight according to the initial iteration value of the relay weight, the downlink SINR threshold, the first CIR, and the second CIR, where the initial iteration value of the pre-coding weight is of the time when the downlink SINR threshold is reached and a total transmit power of the BSs is minimum.

The iteration unit 623 is configured to determine a iteration value of the relay weight according to the initial iteration value of the pre-coding weight, where the iteration value of the relay weight is of the time when the downlink SINR threshold is reached and a total transmit power of the relay stations is minimum; determine a iteration value of the pre-coding weight according to the iteration value of the relay weight, the downlink SINR threshold, and the second CIR, where the iteration value of the pre-coding weight is of the time when the downlink SINR threshold is reached and the total transmit power of the BSs is minimum; re-determine the iteration value of the relay weight according to the iteration value of the pre-coding weight, where the iteration value of the relay weight is of the time when the downlink SINR threshold is reached and the total transmit power of the relay stations is minimum; re-determine the iteration value of the pre-coding weight according to the re-determined iteration value of the relay weight, the downlink SINR threshold, and the second CIR, where the iteration value of the pre-coding weight is of the time when the downlink SINR threshold is reached and the total transmit power of the BSs is minimum; and iterate repeatedly until the minimum total transmit power of the relay stations converges to a fixed value.

The weight determining unit 624 is configured to determine that the iteration value of the pre-coding weight and the iteration value of the relay weight are respectively the pre-coding weight and the relay weight, where the iteration value of the pre-coding weight and the iteration value of the relay weight are of the time when the minimum total transmit power of the relay stations converges to a fixed value.

Based on the above technical solution, the feasibility of the solution can be improved by considering the upper limit of the transmit power of a single relay station when determining the relay weight, and in this case, optionally, the iteration unit 623 may be further configured to determine the iteration value of the relay weight according to the initial iteration value of the pre-coding weight, where the iteration value of the relay weight is of the time when the downlink SINR threshold is reached, the total transmit power of the relay stations is minimum, and the transmit power of any one of the relay stations is smaller than or equal to the preset threshold; determine the iteration value of the pre-coding weight according to the iteration value of the relay weight, the downlink SINR threshold, and the second CIR, where the iteration value of the pre-coding weight is of the time when the downlink SINR threshold is reached and the total transmit power of the BSs is minimum; re-determine the iteration value of the relay weight according to the iteration value of the pre-coding weight, where the iteration value of the relay weight is of the time when the downlink SINR threshold is reached, the total transmit power of the relay stations is minimum, and the transmit power of any one of the relay stations is smaller than or equal to the preset threshold; re-determine the iteration value of the pre-coding weight according to the re-determined iteration value of the relay weight, the downlink SINR threshold, and the second CIR, where the iteration value of the pre-coding weight is of the time when the downlink SINR threshold is reached and the total transmit power of the BSs is minimum; and iterate repeatedly until the minimum total transmit power of the relay stations converges to a fixed value.

In the device for performing weighted processing on the downlink signal according to the embodiments of the present invention, a pre-coding weight for implementing pre-coding weighted processing on a downlink signal to be sent from a BS to an MS is determined for the BS, and a replay weight for performing weighted processing on the downlink signal from the BS to a relay station is determined for the relay station, that is, the downlink signal is optimized at the BS and the relay station respectively, thus optimizing the network capacity and improving the communication quality. The implementation entity of the device for performing weighted processing on the downlink signal is not limited, for example, the device may be independently configured, or integrally formed with the relay station or the BS, and the mechanism for implementing the weighing process on the downlink signal may refer to FIG. 1 to FIG. 5c, as well as the descriptions of the embodiment of the method for performing weighted processing on the downlink signal according to the embodiments of the present invention, so the details will not be given herein again.

Figure 7:
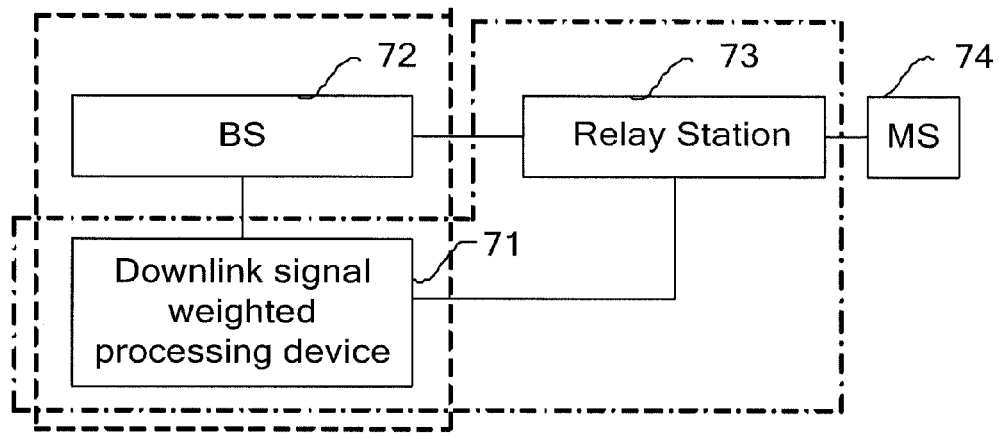
FIG. 7 is a schematic structural view of a communications system according to an embodiment of the present invention.

FIG. 7 is a schematic structural view of a communications system according to an embodiment of the present invention. As shown in FIG. 7, the communications system includes a downlink signal weighted processing device 71, a BS 72, a relay station 73, and an MS 74.

The downlink signal weighted processing device 71 is configured to acquire a first CIR from the BS to the relay station and a second CIR from the relay station to the MS; determine a pre-coding weight and a relay weight according to the first CIR and the second CIR; and respectively send the pre-coding weight and the relay weight to the BS and the relay station.

The BS 72 is configured to perform weighted processing on a downlink signal according to the pre-coding weight to obtain a downlink pre-coding weighted signal and send the downlink pre-coding weighted signal to the relay station.

The relay station 73 is configured to perform weighted processing on the downlink pre-coding weighted signal received from the BS according to the relay weight to obtain a downlink relay weighted signal and send the downlink relay weighted signal to the MS.

The MS 74 is configured to receive the downlink signal weighted by using the pre-coding weight and the relay weight respectively through the relay station 73.

In the above technical solution, the implementation entity of the device for performing weighted processing on the downlink signal is not limited. Optionally, the device for performing weighted processing on the downlink signal may be independently configured, or integrally formed with the relay station as a functional module of the relay station, or integrally formed with the BS as a functional module of the BS. The refined functional structure of the device for performing weighted processing on the downlink signal may refer to the descriptions of the embodiment corresponding to FIG. 6, and the details will not be given herein again.

In the above technical solution, the number of the MSs, the relay stations, and the BSs in the communications system can be determined according to actual requirements. Optionally, the MS may be a single antenna MS, the relay station may be a single antenna relay station, and the BS may be a multi-antenna BS. The mechanism for the nodes in the communications system to interactively implement the weighted processing on the downlink signal may refer to FIG. 1 to FIG. 5c, as well as the descriptions of the embodiments of the method for performing weighted processing on the downlink signal according to the present invention, so the details will not be given herein again.

In the communications system according to the embodiments of the present invention, a pre-coding weight for performing pre-coding weighted processing on a downlink signal to be sent from a BS to an MS is determined for the BS, and a replay weight for performing weighted processing on the downlink signal from the BS to a relay station is determined for the relay station, that is, the downlink signal is optimized at the BS and the relay station respectively, thus optimizing the network capacity and improving the communication quality.

It should be understood by persons of ordinary skill in the art that the accompanying drawings are merely schematic views of the embodiments, and modules or processes in the accompanying drawings are not necessarily required in implementing the present invention.

It should be understood by persons of ordinary skill in the art that, modules in a device according to an embodiment may be distributed in the device of the embodiment according to the description of the embodiment, or be correspondingly changed to be disposed in one or more devices different from this embodiment. The modules of the above embodiment may be combined into one module, or further divided into a plurality of sub-modules.

The sequence numbers of the above embodiments of the present invention are merely for the convenience of description, and do not imply the preference among the embodiments.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the scope of the present invention.

What is claimed is:

1. A method for performing weighted processing on a downlink signal, comprising:

acquiring a first Channel Impulse Response (CIR) from a Base Station (BS) of a relay communications system to a relay station of a plurality of relay stations of the relay communication system and a second CIR from the relay station to a Mobile Station (MS);

determining a pre-coding weight and a relay weight according to the first CIR and the second CIR; and sending the pre-coding weight to the BS and sending the relay weight to the relay station, so that the BS is enabled to perform weighted processing on a downlink signal according to the pre-coding weight to obtain a downlink pre-coding weighted signal and send the downlink pre-coding weighted signal to the relay station, and the relay station is enabled to perform weighted processing on the downlink pre-coding weighted signal received from the BS according to the relay weight to obtain a downlink relay weighted signal and send the downlink relay weighted signal to the MS, wherein the determining the pre-coding weight and the relay weight according to the first CIR and the second CIR comprises:

determining an initial iteration value of the relay weight and a downlink Signal to Noise Ratio (SINR) threshold, determining an initial iteration value of the pre-coding weight of a time when the downlink SINR threshold is reached and a total transmit power of the BS is minimum according to the initial iteration value of the relay weight, the downlink SINR threshold, the first CIR, and the second CIR, determining an iteration value of the relay weight of a time when the downlink SINR threshold is reached and a total transmit power of the plurality of relay stations is minimum according to the initial iteration value of the pre-coding weight, determining an iteration value of the pre-coding weight of a time when the downlink SINR threshold is reached and the total transmit power of the BS is minimum according to the iteration value of the relay weight, the downlink SINR threshold, and the second CIR, re-determining an iteration value of the relay weight of a time when the downlink SINR threshold is reached and the total transmit power of the plurality of relays stations is minimum according to the iteration value of the pre-coding weight; re-determining an iteration value of the pre-coding weight of a time when the downlink SINR threshold is reached and the total transmit power of the BS is minimum according to the re-determined iteration value of the relay weight, the downlink SINR threshold, and the second CIR; and iterating repeatedly until the minimum total transmit power of the plurality of relay stations converges to a fixed value, and determining that an iteration value of the pre-coding weight and an iteration value of the relay weight are respectively the pre-coding weight and the relay weight, where the iteration value of the pre-coding weight and the iteration value of the relay weight are of a time when the minimum total transmit power of the plurality of relay stations converges to a fixed value.

2. The method for performing weighted processing on the downlink signal according to claim 1, wherein
the initial iteration value of the pre-coding weight or the iteration value of the pre-coding weight is determined by the following formula:

$$\min_{t_1, t_2 \cdots t_M} \sum_{k=1}^{M} Tr\{T_k\}$$

$$\text{s.t.} \quad Tr\left(U_k\left(T_k - \gamma_k \sum_{j=1, j \neq k}^{M} T_j\right)\right) \geq \gamma_k(Tr(WR_g^k W^H)\sigma_v^2 + \sigma_n^2)$$

where
$T_k = t_k^H t_k$, k=1, 2, ..., M
$W = \mathrm{diag}(w_1 w_2 \ldots w_r \ldots w_R)$
$U_k = H^H W R_g^k W^H H$
if the number of the MS is one, the iteration value of the relay weight is determined by the following formula:

$$w = \left(\frac{\gamma \sigma_n^2}{u^H D^{-1/2}(C - \gamma E) D^{-1/2} u}\right)^{\frac{1}{2}} D^{-\frac{1}{2}} \wp\left(D^{-\frac{1}{2}}(C - \gamma E) D^{-\frac{1}{2}}\right)$$

where $$u = \wp\left(D^{-\frac{1}{2}}(C - \gamma E) D^{-\frac{1}{2}}\right)$$

$D \triangleq \mathrm{diag}([R_x]_{1,1}, [R_x]_{2,2}, \ldots, [R_x]_{R,R})$ $C = \mathrm{diag}(g^T) H t t^H H^H \mathrm{diag}(g^*)$ $E = \sigma_v^2 \mathrm{diag}(g^T) \mathrm{diag}(g^*)$ $\wp(\ )$ represent seeking a dominant eigenvector
if multiple MSs are provided, the iteration value of the relay weight is a relay weight corresponding to a global optimal solution when Rank(Z)=1 in the following formula:
$\min_Z Tr(ZD)$
s.t. $Tr(Z(E_k - \gamma_k F_k)) \geq \gamma_k \sigma_n^2$, and $Z \geq 0$ for k=1, 2, ..., M
where $Z = w w^H$ $D \triangleq \mathrm{diag}([R_x]_{1,1}, [R_x]_{2,2}, \ldots, \{R_x\}_{R,R})$ $R_x = H t t^H H^H + \sigma_v^2 I$ $E_k = \mathrm{diag}(g_k^T) H t_k t_k^H H^H \mathrm{diag}(g_k^*)$ $F_k = \mathrm{diag}(g_k^T)\left(H\left(\sum_{j=1, j \neq k}^{M} t_k t_k^H\right) H^H + \sigma_v^2 I\right)\mathrm{diag}(g_k^*)$ in the above formulas,
$\gamma$ represents the downlink SINR threshold of the MS;
t represents the initial iteration value of the pre-coding weight or the iteration value of the pre-coding weight;
$g_k$ represents the second CIR from the relay station to the MS;
$R_g^k$ represents an autocorrelation matrix of $g_k$, the superscript or subscript k represents a sequence number of the MS, and $1 \leq k \leq M$, M representing a total number of the MSs;
$\sigma_v^2$ represents a downlink interference power, and $\sigma_n^2$ represents a downlink noise power;
w represents the initial value of the relay weight or the iteration value of the relay weight, the subscript r represents a sequence number of the relay station, and $1 \leq r \leq R$ representing a total number of the relay stations;
H represents the first CIR from the BS to the relay station; and
$R_x$ represents an energy sum of the autocorrelation matrix of the pre-coded H and the interference, $[R_x]_{1,1}$ represents Row 1, Column 1 of $R_x$, and $[R_x]_{R,R}$ represents Row R, Column R of $R_x$.

3. The method for performing weighted processing on the downlink signal according to claim 1, wherein the determining or re-determining the iteration value of the relay weight of the time when the downlink SINR threshold is reached and the total transmit power of the plurality of relay stations is minimum according to the initial iteration value of the pre-coding weight or the iteration value of the pre-coding weight comprises:
determining or re-determining the iteration value of the relay weight of the time when the downlink SINR threshold is reached, the total transmit power of the plurality of relay stations is minimum, and the transmit power of any one of the relay stations is smaller than or equal to a preset threshold according to the initial iteration value of the pre-coding weight or the iteration value of the pre-coding weight.

4. The method for performing weighted processing on the downlink signal according to claim 3, wherein
the initial iteration value of the pre-coding weight or the iteration value of the pre-coding weight is determined by the following formula:

$$\min_{t_1, t_2 \cdots t_M} \sum_{k=1}^{M} Tr\{T_k\}$$

$$\text{s.t.} \quad Tr\left(U_k\left(T_k - \gamma_k \sum_{j=1, j \neq k}^{M} T_j\right)\right) \geq \gamma_k(Tr(WR_g^k W^H)\sigma_v^2 + \sigma_n^2)$$

where
$T_k = t_k^H t_k$, k=1, 2, ..., M
$W = \mathrm{diag}(w_1, w_2 \ldots w_r \ldots w_R)$
$U_k = H^H W R_g^k W^H H$
if multiple MSs are provided, the iteration value of the relay weight is a relay weight corresponding to the global optimal solution when Rank(Z)=1 in the following formula:
$\min_Z Tr(ZD)$
s.t. $Tr(Z (E_k - \gamma_k F_k)) \geq \gamma_k \sigma_n^2$, for k=1, 2, ..., M
$Z_{i,i} \leq P_{Ri}/[D]_{i,i}$, for i=1, 2, ..., R and $Z \geq 0$ where $$Z = ww^H$$
$$D \triangleq \operatorname{diag}([R_x]_{1,1}, [R_x]_{2,2}, \ldots, [R_x]_{R,R})$$
$$R_x = Htt^H H^H + \sigma_v^2 I$$
$$E_k = \operatorname{diag}(g_k^T) H t_k t_k^H H^H \operatorname{diag}(g_k^*)$$
$$F_k = \operatorname{diag}(g_k^T)\left(H\left(\sum_{j=1,j\neq k}^M t_k t_k^H\right) H^H + \sigma_v^2 I\right)\operatorname{diag}(g_k^*)$$

in the above formulas,

γ represents the downlink SINR threshold of the MS;

t represents the initial iteration value of the pre-coding weight or the iteration value of the pre-coding weight;

$g_k$ represents the second CIR from the relay station to the MS;

$R_g^k$ represents the autocorrelation matrix of $g_k$, the superscript or subscript k represents the sequence number of the MS, and 1≤k≤M, M representing the total number of the MSs;

$\sigma_v^2$ represents the downlink interference power, and $\sigma_n^2$ represents the downlink noise power;

w represents the initial value of the relay weight or the iteration value of the relay weight, the subscript r represents the sequence number of the relay station, and 1≤r≤R, R representing the total number of the relay stations;

H represents the first CIR from the BS to the relay station;

$R_x$ represents the energy sum of the autocorrelation matrix of the pre-coded H and the interference, $[R_x]_{1,1}$ represents Row 1, Column 1 of $R_x$, and $[R_x]_{R,R}$ represents Row R, Column R of $R_x$; and $P_{Ri}$ represents the preset threshold of the transmit power of the single relay station.

5. A device for performing weighted processing on a downlink signal, comprising:

a memory storing computer instructions therein; and a computer which executes the instructions stored in the memory, so that the computer is operable to provide:

an acquiring module to acquire a first Channel Impulse Response (CIR) from a Base Station (BS) of a relay communications system to a relay station of a plurality of relay stations of the relay communication system and a second CIR from the relay station to a Mobile Station (MS), a weight determining module to determine a pre-coding weight and a relay weight according to the first CIR and the second CIR, and a weighted processing module to send the pre-coding weight to the BS and send the relay weight to the relay station, so that the BS is enabled to perform weighted processing on a downlink signal according to the pre-coding weight to obtain a downlink pre-coding weighted signal and send the downlink pre-coding weighted signal to the relay station, and the relay station is enabled to perform weighted processing on the downlink pre-coding weighted signal received from the BS according to the relay weight to obtain a downlink relay weighted signal and send the downlink relay weighted signal to the MS, wherein the weight determining module comprises:

a relay weight and Signal to Noise Ratio (SINR) initializing unit to determine an initial iteration value of the relay weight and a downlink SINR threshold, a pre-coding weight initial value determining unit to determine an initial iteration value of the pre-coding weight of a time when the downlink SINR threshold is reached and a total transmit power of the BS is minimum according to the initial iteration value of the relay weight, the downlink SINR threshold, the first CIR, and the second CIR, an iteration unit to determine an iteration value of the relay weight of a time when the downlink SINR threshold is reached and a total transmit power of the plurality of relay stations is minimum according to the initial iteration value of the pre-coding weight; determine an iteration value of the pre-coding weight of a time when the downlink SINR threshold is reached and the total transmit power of the BS is minimum according to the iteration value of the relay weight, the downlink SINR threshold, and the second CIR; re-determine an iteration value of the relay weight of a time when the downlink SINR threshold is reached and the total transmit power of the plurality of relay stations is minimum according to the iteration value of the pre-coding weight; re-determine an iteration value of the pre-coding weight of a time when the downlink SINR threshold is reached and the total transmit power of the BS is minimum according to the re-determined iteration value of the relay weight, the downlink SINR threshold, and the second CIR; and iterate repeatedly until the minimum total transmit power of the plurality of relay stations converges to a fixed value, and a weight determining unit to determine that an iteration value of the pre-coding weight and an iteration value of the relay weight are respectively the pre-coding weight and the relay weight, where the iteration value of the pre-coding weight and the iteration value of the relay weight are of a time when the minimum total transmit power of the plurality of relay stations converges to a fixed value.

6. The device for weighted processing the downlink signal according to claim 5, wherein the iteration unit is further configured to determine an iteration value of the relay weight of a time when the downlink SINR threshold is reached, the total transmit power of the plurality of relay stations is minimum, and the transmit power of any one of the relay stations of the plurality of relay stations is smaller than or equal to a preset threshold according to the initial iteration value of the pre-coding weight; determine an iteration value of the pre-coding weight of a time when the downlink SINR threshold is reached and the total transmit power of the BS is minimum according to the iteration value of the relay weight, the downlink SINR threshold, and the second CIR; re-determine an iteration value of the relay weight of a time when the downlink SINR threshold is reached, the total transmit power of the plurality of relay stations is minimum, and the transmit power of any one of the relay stations of the plurality of relay stations is smaller than or equal to the preset threshold according to the iteration value of the pre-coding weight; re-determine an iteration value of the pre-coding weight of a time when the downlink SINR threshold is reached and the total transmit power of the BS is minimum according to the re-determined iteration value of the relay weight, the downlink SINR threshold, and the second CIR; and iterate repeatedly until the minimum total transmit power of the relay stations converges to a fixed value.

7. The device for performing weighted processing on the downlink signal according to claim 5, wherein the device for performing weighted processing on the downlink signal is integrally formed with the relay station, or the device for performing weighted processing on the downlink signal is integrally formed with the BS.

8. A communications system comprising:
a Base Station (BS);
a plurality of relay stations;
a Mobile Station (MS); and
a downlink signal weighted processing device, configured to acquire a first Channel Impulse Response (CIR) from the BS to a relay station of the plurality of relay stations and a second CIR from the relay station to the MS; determine a pre-coding weight and a relay weight according to the first CIR and the second CIR; and send the pre-coding weight to the BS and send the relay weight to the relay station, wherein
the BS is configured to perform weighted processing on a downlink signal according to the pre-coding weight to obtain a downlink pre-coding weighted signal and send the downlink pre-coding weighted signal to the relay station,
the relay station is configured to perform weighted processing on the downlink pre-coding weighted signal received from the BS according to the relay weight to obtain a downlink relay weighted signal and send the downlink relay weighted signal to the MS, and
the downlink signal weighted processing device is configured to determine the pre-coding weight and the relay weight according to the first CIR and the second CIR by:
  determining an initial iteration value of the relay weight and a downlink Signal to Noise Ratio (SINR) threshold,
  determining an initial iteration value of the pre-coding weight of a time when the downlink SINR threshold is reached and a total transmit power of the BS is minimum according to the initial iteration value of the relay weight, the downlink SINR threshold, the first CIR, and the second CIR,
  determining an iteration value of the relay weight of a time when the downlink SINR threshold is reached and a total transmit power of the plurality of relay stations is minimum according to the initial iteration value of the pre-coding weight,
  determining an iteration value of the pre-coding weight of a time when the downlink SINR threshold is reached and the total transmit power of the BS is minimum according to the iteration value of the relay weight, the downlink SINR threshold, and the second CIR,
  re-determining an iteration value of the relay weight of a time when the downlink SINR threshold is reached and the total transmit power of the plurality of relay stations is minimum according to the iteration value of the pre-coding weight; re-determining an iteration value of the pre-coding weight of a time when the downlink SINR threshold is reached and the total transmit power of the BS is minimum according to the re-determined iteration value of the relay weight, the downlink SINR threshold, and the second CIR; and iterating repeatedly until the minimum total transmit power of the plurality of relay stations converges to a fixed value, and
  determining that an iteration value of the pre-coding weight and an iteration value of the relay weight are respectively the pre-coding weight and the relay weight, where the iteration value of the pre-coding weight and the iteration value of the relay weight are of a time when the minimum total transmit power of the relay stations converges to a fixed value.

9. The communications system according to claim 8, wherein a device for performing weighted processing on the downlink signal is integrally formed with the relay station, or the device for performing weighted processing on the downlink signal is integrally formed with the BS.

10. The communications system according to claim 8, wherein the MS is a single antenna MS, the relay station is a single antenna relay station, and the BS is a multi-antenna BS.

* * * * *

UNITED STATES PATENT AND TRADEMARK OFFICE
CERTIFICATE OF CORRECTION

PATENT NO. : 8,811,455 B2  
APPLICATION NO. : 12/944189  
DATED : August 19, 2014  
INVENTOR(S) : Yi et al.

Page 1 of 1

It is certified that error appears in the above-identified patent and that said Letters Patent is hereby corrected as shown below:

On the Title Page

Item [73] Delete "Huawei Tehnologies Co., Ltd.," insert -- Huawei Device Co., Ltd., --, therefor.

Signed and Sealed this  
Seventh Day of April, 2015

Michelle K. Lee  
*Director of the United States Patent and Trademark Office*